Jan. 12, 1960      F. KELLNER      2,920,545
FOCUSING DEVICE FOR PHOTOGRAPHIC LENSES
Filed July 23, 1957
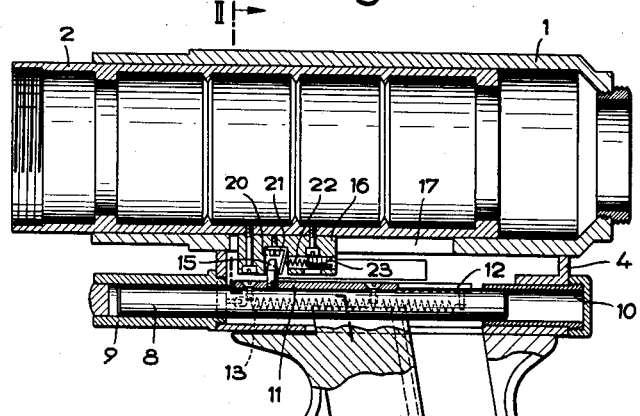
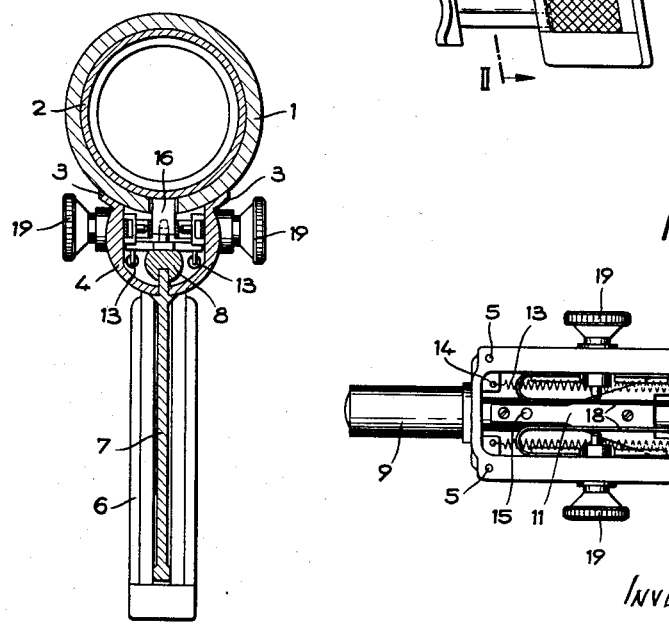
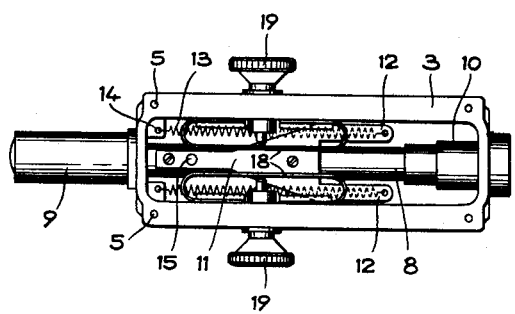
INVENTOR
FERDINAND KELLNER
by Walter S. Heaton
ATTORNEY United States Patent Office 2,920,545
Patented Jan. 12, 1960

2,920,545
FOCUSING DEVICE FOR PHOTOGRAPHIC LENSES

Ferdinand Kellner, Buxach near Memmingen, Germany, assignor to Novoflex Fotogeratebau Karl Muller, Memmingen, Germany Application July 23, 1957, Serial No. 673,602

Claims priority, application Germany July 24, 1956

4 Claims. (Cl. 95—45)

The invention relates to a focusing device for photographic lenses, especially for lenses of long focal length used with reflex cameras which are fitted with a grip to be grasped by one of the user's hands for holding the camera during the taking of a picture. With the known focusing devices of this type the lens mount is held under the action of a spring in its one end position and may be moved by means of an operative member against the action of said spring to any desired focusing position.

In my copending application Serial No. 535,941 this operative member is arranged in the manner of a trigger in relation to said grip. The operative member is in reach of the grip of the camera and forms together with said grip a handhold which can be grasped by one of the user's hands and is variable in its width. The movement of the operative member is transmitted by means of a rack operatively connected thereto to a pinion which is rotated thereby and is in mesh with a further rack provided on a lens mount longitudinally thereof. Thus, upon rotation of the pinion, a longitudinal shifting movement is imparted to the lens mount. This drive connection permits the necessary shifting of the lens for focusing.

The present invention is directed to an improvement of the construction described hereinbefore and is characterized in that the trigger-like operative member arranged in reach of the grip of the camera is directly connected to the lens mount. This results in a remarkably simplified design since all of the hitherto necessary gearing elements, such as racks and pinions, may be omitted, which in addition provides an essential advantage in that any lost motion in the operation of the focusing device is excluded. For this purpose it is sufficient to provide a rectilinear guide member, preferably within the supporting member supporting the tubular member telescopically housing the lens mount. This guide member may be in the form of a slidably mounted rod.

A further improvement consists in that the power storage means, generally consisting of a helical spring, is no longer located as hitherto within the supporting member in coaxial relation to a slidably mounted guide element but laterally of the rectilinear guide member for the trigger-like operative member. In order to further reduce the constructional length of the supporting member, in a preferred embodiment of the invention, the power storage means comprise two helical springs located within the supporting member at both sides of and in parallel relationship to the slidably mounted guide rod.

A projection on the lens mount extends through a longitudinal slot of the tubular member. This projection may be provided with a recess for coupling it with a cam member fixed to the guide rod of the operative member and is slidable within the supporting member between lateral guide members adjustably urged against said projection. These guide members may be spring brackets abutting against set screws so that the focusing device is provided with an adjustable restraint against the displacement and in addition may be locked in any desired position.

The trigger-like operative member is commonly attached to the front edge of the grip for the camera but may be located also on the opposite side of the grip. It is important that both the grip and the operative member may be grasped in common by one hand of the user and resiliently approached to each other, while the operative member upon being released automatically returns to its position in which it is most remote from the grip. The power transmission from the operative member may be effected also hydraulically. In this case the operative member is arranged to act on a pressure fluid causing by means of a piston the adjustment of the lens mount. This action may be obtained also by making the grip and the operative member of a resilient material acting upon compression on the pressure fluid.

Further details and advantages of the invention will be apparent from the description given hereinafter and the accompanying drawing illustrating an embodiment thereof by way of example.

In the drawing,

Fig. 1 is a longitudinal section of a telephoto lens equipped with a focusing device according to the invention, the camera housing being omitted, Fig. 2 is a cross-section along line II—II in Fig. 1, Fig. 3 is a plan view of the supporting member after removal of the tubular member.

Referring now to the drawings, Figs. 1 and 2 show a tubular member 1 within which a tubular lens mount 2 is telescopically shiftable and which is secured to a flange 3 of a supporting member 4 as by means of screws, not shown, passed through holes 5 provided in flange 3. A grip 6 is rigidly connected to the supporting member 4, such as by being integrally cast therewith. An operative member 7 is shiftably guided within a recess in the form of a slot provided in the medium plane of the grip 6 and forms together with the latter a handhold which may be resiliently compressed by the user's hand grasping it and which upon releasing automatically resumes its larger form.

The trigger-like operative member 7 has rigidly connected thereto a guide rod 8 slidably guided within a cylindrical front end 9 and a likewise cylindrical rear end 10 of the supporting member 4. The upper surface of the guide rod 8 is flattened and has fastened thereto by means of screws (not shown) a horizontal plate member 11 being formed with a pair of fork-type extensions 12 to which the one ends of two helical springs 13 are anchored the other ends of which are hooked in two eyes 14 of the supporting member. These two helical springs 13 are accommodated within the supporting member 4 on both sides of the guide rod 8 in parallel relationship thereto and are to be stressed on tension.

The plate member 11 has a cam member 15 fixed thereto engaging with a recess 20 of a projection 16 of the shiftable tubular lens mount 2. This projection 16 extends through a longitudinal slot 17 of the tubular member 1 so that the tubular lens mount 2 is operatively coupled with the operative member 7. This projection 16 is further slidably guided between lateral guide members 18 which may be spring brackets and are mounted within the supporting member. Set screws 19 are provided which are to be actuated externally and are with their points abutting said spring brackets 18 thus permitting to vary the sliding resistance and to lock the projection 16 together with the tubular lens mount 2 in any desired position.

The one side wall of the recess 20 in the projection 16 of the shiftable tubular lens mount 2 is defined by an angular leaf spring 21 bearing against the cam member 15 under the pressure of a helical spring 22 adjustable by a screw 23.

It will be apparent to those skilled in the art that many alterations and modifications of the structure shown and described may be made without departure from the essence and spirit of the invention which for that reason shall not be limited but by the scope of the appended claims.

I claim:

1. In a camera the combination of a tubular housing, a cylindrical lens mount shiftable in said housing between two end positions, a hollow supporting member lengthwise of and secured to the lower housing portion, said member including a downwardly extending grip adapted to be grasped by one of the user's hands, said housing being provided with a longitudinal slot opening into said supporting member, a downward extension of said mount extending through said slot into said supporting member, an operating member in a location so as to be grasped by said user's hand which holds said grip, said supporting member being provided in its lower portion with a second longitudinal slot, said operative member extending through said second slot and being coupled to said extension, said operative member being shiftable closer to said grip when said user's hand compresses said grip and said operative member, and a resilient means secured endwise to said supporting member and a part secured to said operating member so as to move said operating member away from said grip when the pressure by the user's hand is eased.

2. A device as in claim 1, further comprising a rod lengthwise guided within said supporting member, said operating member being secured to said rod, said rod being coupled to said mount extension, and said resilient means being endwise attached to said supporting member and a part connected to said rod and being located within said supporting member sideways of said rod.

3. A device as in claim 1, further comprising guide brackets within said supporting member and laterally in engagement with said extension.

4. A device as in claim 1, further comprising resilient lateral guide members for said extension and located in said supporting member, and two adjustable set screws engaging said guide members for adjusting the pressure exercised between said extension and said guide members.

References Cited in the file of this patent

UNITED STATES PATENTS

| | | |
|---|---|---|
| 2,124,468 | Parlini | July 19, 1938 |
| 2,414,083 | Borden | Jan. 14, 1947 |
| 2,732,763 | Back et al. | Jan. 31, 1956 |